(12) United States Patent
Lupu et al.

(10) Patent No.: US 8,776,093 B2
(45) Date of Patent: Jul. 8, 2014

(54) FAILED PROCESS REPORTING

(75) Inventors: Corneliu I. Lupu, Sammamish, WA (US); Gerald Francis Maffeo, Woodinville, WA (US); Michael Hans Krause, Redmond, WA (US); Stephan A. Doll, Seattle, WA (US); Vamshidhar R. Kommineni, Seattle, WA (US); William Hunter Hudson, Kirkland, WA (US); Yi Meng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 151 days.

(21) Appl. No.: 13/105,266

(22) Filed: May 11, 2011

(65) Prior Publication Data
US 2011/0214017 A1 Sep. 1, 2011

Related U.S. Application Data

(63) Continuation of application No. 11/413,421, filed on Apr. 28, 2006, now Pat. No. 7,958,512, which is a continuation-in-part of application No. 11/263,318, filed on Oct. 31, 2005.

(51) Int. Cl.
G06F 11/00 (2006.01)
G06F 3/00 (2006.01)
(52) U.S. Cl.
USPC ........................................ 719/328; 714/38.11
(58) Field of Classification Search
None
See application file for complete search history.

(56) References Cited

U.S. PATENT DOCUMENTS

| 5,133,074 | A | 7/1992 | Chou |
| 5,459,871 | A | 10/1995 | Van Den Berg |
| 5,489,571 | A | 2/1996 | Woodard et al. |
| 5,592,670 | A | 1/1997 | Pletcher |
| 6,173,308 | B1 * | 1/2001 | Hilditch et al. ............... 718/106 |
| 6,453,430 | B1 * | 9/2002 | Singh et al. ................... 714/47.3 |
| 6,546,443 | B1 | 4/2003 | Kakivaya et al. |
| 6,593,940 | B1 | 7/2003 | Petersen et al. |

(Continued)

FOREIGN PATENT DOCUMENTS

WO    WO-03077127    9/2003

OTHER PUBLICATIONS

Macri, Philip P. "Deadlock Detection and Resolution in a Codasyl Based Data Management System," 1976, p. 45-49.*

(Continued)

Primary Examiner — H S Sough
Assistant Examiner — Carina Yun
(74) Attorney, Agent, or Firm — John Jardine; Andrew Sanders; Micky Minhas

(57) ABSTRACT

An application programming interface (API) that leverages operating system instrumentation to provide a chain of threads and processes may alleviate some debugging complications. Specifically, the chain may start with the first thread in the process that experienced the original failure and end with the last thread upon which the first thread directly or indirectly depends. The API may aid debugging efforts by classifying all threads related or dependent upon an original failed thread into specific categories of failures, requesting further information from the originating OS concerning specific failed threads, and using that information to debug the failed application or process more thoroughly.

20 Claims, 7 Drawing Sheets

(56) References Cited

U.S. PATENT DOCUMENTS

| | | | |
|---|---|---|---|
| 6,714,958 B1 | 3/2004 | Tudor | |
| 6,721,775 B1 | 4/2004 | Fagen et al. | |
| 7,243,267 B2 | 7/2007 | Klemm et al. | |
| 7,496,918 B1* | 2/2009 | Dice et al. | 718/100 |
| 7,958,512 B2 | 6/2011 | Lupu et al. | |
| 2002/0147835 A1 | 10/2002 | Zatloukal et al. | |
| 2003/0145035 A1 | 7/2003 | de Bonet | |
| 2003/0167421 A1 | 9/2003 | Klemm | |
| 2004/0025164 A1 | 2/2004 | Ma et al. | |
| 2004/0034642 A1 | 2/2004 | Szilagyi et al. | |
| 2004/0162706 A1 | 8/2004 | Tudor | |
| 2004/0199734 A1 | 10/2004 | Rajamani et al. | |
| 2004/0230763 A1* | 11/2004 | Cohen et al. | 711/170 |
| 2005/0028157 A1* | 2/2005 | Betancourt et al. | 718/100 |
| 2005/0108682 A1 | 5/2005 | Piehler et al. | |
| 2005/0120273 A1* | 6/2005 | Hudson et al. | 714/38 |
| 2005/0183068 A1* | 8/2005 | Cwalina et al. | 717/128 |
| 2005/0204180 A1 | 9/2005 | Krishnaswamy et al. | |
| 2006/0005085 A1 | 1/2006 | Zunino et al. | |
| 2006/0070037 A1* | 3/2006 | Canning et al. | 717/127 |
| 2006/0271938 A1* | 11/2006 | Gootherts et al. | 718/107 |
| 2007/0101324 A1 | 5/2007 | Lupu | |
| 2007/0101338 A1 | 5/2007 | Heddaya | |
| 2008/0092147 A1* | 4/2008 | Kersten | 719/316 |

OTHER PUBLICATIONS

Singhal, M. "Deadlock Detection in Distributed Systems," 1989, p. 37-48.*

"Advisory Action", U.S. Appl. No. 11/413,421, (Mar. 11, 2010), 3 pages.

"Final Office Action", U.S. Appl. No. 11/413,421, (Nov. 12, 2010), 20 pages.

"Final Office Action", U.S. Appl. No. 11/413,421, (Dec. 8, 2009), 17 pages.

"Non-Final Office Action", U.S. Appl. No. 11/263,318, (Apr. 13, 2011), 11 pages.

"Non-Final Office Action", U.S. Appl. No. 11/413,421, (Jul. 7, 2010), 13 pages.

"Non-Final Office Action", U.S. Appl. No. 11/413,421, (Jul. 22, 2009), 15 pages.

"Notice of Allowance", U.S. Appl. No. 11/413,421, (Feb. 2, 2011), 7 pages.

Venkatesh, S et al., "Deadlock Detection and Resolution for Discrete Event Simulation: Multiple-Unit Seizzes", Department of Industrial Engineering; Texas A&M University; retreived from www.springerlink.com/(a2v1x145ijunxmnst2iwe55)/app/home/contribution.asp?ref . . . on Jan. 10, 2006, (1998), 37 pages.

Wu, Haisang et al., "Utility Accrual Scheduling Under Arbitrary Time/Utility Functions and Multi-unit Resource Constraints", Department of Electrical and Computer Engineering: Virginia Tech; *Proceedings of the 10th Real-Time and Embedded Computing Systems and Applications*, (2004), 19 pages.

"Final Office Action", U.S. Appl. No. 11/263,318, (Oct. 5, 2011), 14 pages.

"Non-Final Office Action", U.S. Appl. No. 11/263,318, (Jul. 20, 2012), 13 pages.

* cited by examiner

FAILED PROCESS REPORTING

RELATED APPLICATIONS

This application is a continuation of and claims priority to U.S. application Ser. No. 11/413,421, entitled "Instrumentation to Find the Thread or Process Responsible for an Application Failure" to Lupu, et al., filed Apr. 28, 2006, which in turn claims priority to and is a continuation-in-part of U.S. application Ser. No. 11/263,318, entitled "Detection, Diagnosis and Resolution of Deadlocks and Hangs" to Heddaya, et al., filed Oct. 31, 2005, the disclosures of which are incorporated in their entirety by reference herein.

BACKGROUND

Operating systems (OS) are a key building block in the development of computing systems. Over the several decades since personal computing has become widespread, operating systems have substantially increased in complexity. The ability to multi-task and support concurrent processes has given even modest personal computers the appearance of simultaneously running a wide variety of programs from word processors to Internet browsers.

In fact, though, virtually all microprocessor-based systems run one program at a time, using a scheduler to guarantee that each running program is given processor time in sufficient quantities to keep running. This task can become quite complex. Each process running on a computer can spawn individual tasks called threads. Some threads can spawn subordinate threads. It is common to have dozens, or even hundreds, of threads active at a given time. On the other hand, the computer may have a limited number of resources, such as disk storage or network input/output. Even though each resource can often support multiple threads, in many cases a thread may have to wait for access to a given resource until a different thread releases it.

A thread can lock a resource it is using and make it unavailable for other threads. A common situation occurs where two or more threads require resources that are locked by another thread. When threads lock each other's resources a deadlock may occur. Typically, a timeout timer will fire when inactivity is observed over a pre-determined time period and kill one or more of the involved threads. Unfortunately, most users are less patient than the timers and will intervene before the timeout period with a reset or other dramatic action. The timeout time can be shortened to beat user's impatience but at the risk of killing slow but not-deadlocked threads.

Another way to address deadlocks is strict monitoring of every locking relationship. However, in modern high-clock rate systems, locks can be placed and released in a matter of microseconds and it is not unusual for hundreds of locks to exist at any moment in time. Therefore, strict monitoring may require more processor resources than those being monitored and the associated memory write times could slow processing to a crawl.

The standard approaches to diagnosing and solving deadlocks are live debugging of the application process or capturing detailed information about the processes involved in the failure from the memory at the time of the failure for post-mortem analysis. Because a first thread's failure may be due to its dependency on a second thread's failure, finding the root source of a failure may be complicated. To find the root cause, the other thread or process which is responsible for the failure must be identified. However, the root failure is difficult to obtain during post-mortem because information to trace the root cause thread is not included in the process memory dump. Furthermore, even if the root cause failed thread can be obtained through additional debugging using the process memory dump, it may be impossible to debug further because information about the root cause process is not collected at the time of the failure.

SUMMARY

An operating system may monitor, verify and assess deadlock conditions by taking advantage of the fact that, by definition, deadlocks are persistent. A quick scan of locking relationships may be made, building an approximation of locks and dependencies. It is an approximation because even several clock cycles after scanning the locking relationships, those relationships are obsolete. Even between the beginning of the scan and the end, the relationships may change. An analysis of the scan of locking relationships may show cyclical relationships as described above, but in fact, it may not be cyclical and only an artifact of a locking relationship that no longer exists.

However, a real deadlock may exist. By examining the locking relationships a second time, particularly targeting suspect locking relationships of the first scan, a deadlock can be verified because it will persist over extended periods of time. When a deadlock is confirmed, data corresponding to the threads and resources involved can be forwarded to a monitor or other process that can intervene to break the deadlock, preferably before a user notices the incident.

Although not a deadlock by definition, a similar situation called a hang, where a thread or resource stops or becomes inaccessible and blocks predecessors with locking relationships can be monitored and verified in a similar fashion. Determining hangs can be useful for both resolving the hang and diagnosing root causes for the situation.

An application programming interface (API) that leverages operating system instrumentation to provide a chain of threads and processes may alleviate some debugging complications. Specifically, the chain may start with the first thread in the process that experienced the original failure and end with the last thread upon which the first thread directly or indirectly depends. The API may aid debugging efforts by classifying all threads related or dependent upon an original failed thread into specific categories of failures, requesting further information from the originating OS concerning specific failed threads, and using that information to debug the failed application or process more thoroughly.

DETAILED DESCRIPTION

Overview

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
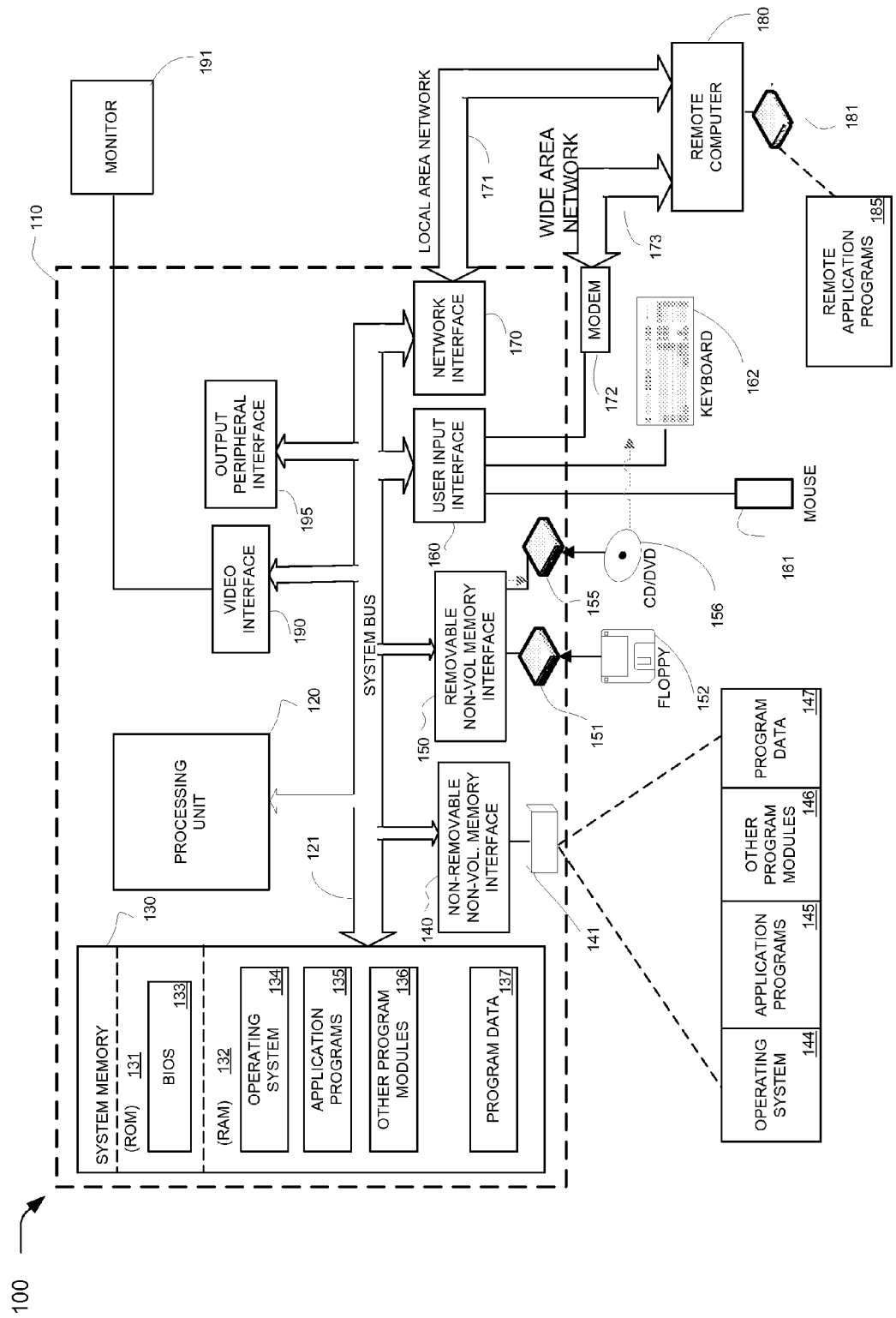
FIG. 1 is a simplified and representative block diagram of a computer in accordance with one or more embodiments.

FIG. 1 illustrates an example of a suitable computing system environment 100 on which a system for the steps of the claimed method and apparatus may be implemented. The computing system environment 100 is only one example of a suitable computing environment and is not intended to suggest any limitation of the scope of use or functionality of the claimed method or apparatus. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc., that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer or PC 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, computer storage media refers to computer readable media that are configured to store information, and thus the terms "computer storage media" and/or "computer storage medium" do not include communication media as used herein.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices which may be connected through an output peripheral interface 190 or connected via the network interface 170.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Application failures may occur on a computing device 110 and reported to a separate remote computing device 180. Generally, application failures may describe any event occurring in one application that interrupts the predicted or normal functioning of other applications or hardware operating on either the computing device 110 or the remote computing device 180. The application failure may relate to a wide variety of programs executing on the computers' 110, 180 system memory 130 and may include, without limitation, failures relating to the BIOS 133, operating system 134, application programs 135, other program modules 136, and the program data 137.

Additionally, the application failures may relate to problems associated with applications stored in non-removable, non-volatile memory 141 and may include, without limitation, the operating system 144, application programs 145, other program modules 146, or the program data 147. Further, the application failures may relate to applications stored on or executing from removable, non-volatile memory 151, 155 such as a floppy disk 152 or an optical disk 156. The application failures may also relate to remote application programs 185 executing on the remote computer 180. Additionally the application failures may relate to any hardware device, interface, network connection, or internal connection associated with the computers 110, 180.

Figure 2:
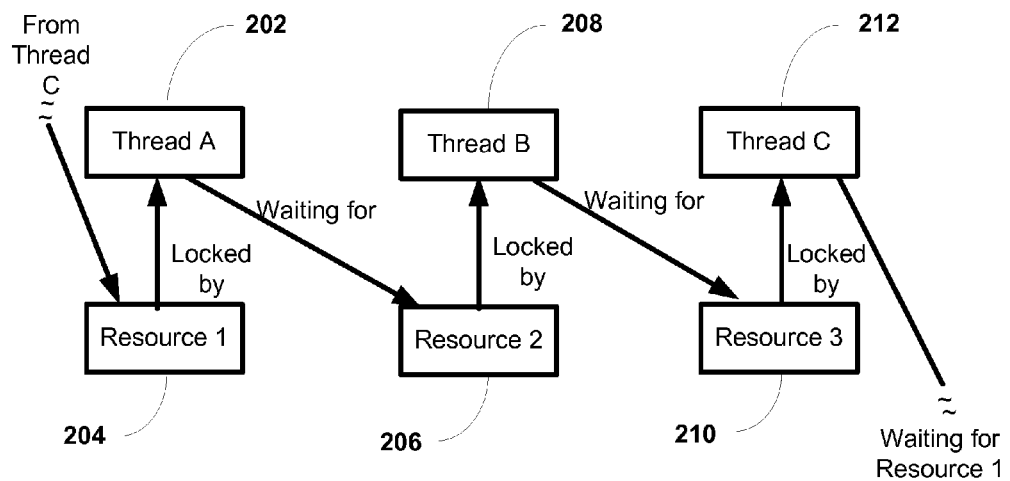
FIG. 2 is a block diagram showing a wait-chain relationship in a computer in accordance with one or more embodiments.

Application failures may occur in a variety of situations. FIG. 2 is a block diagram showing a wait-chain relationship illustrating a condition in a computer known as a deadlock. Thread A 202 owns the lock on Resource 1 204, Thread A 202 is also waiting for Resource 2 206. Thread A 202 cannot access Resource 2 206 because it is locked by Thread B 208. In turn, Thread B 208 is waiting for Resource 3 210. Resource 3 210 is locked by Thread C 212. To this point, this is not necessarily a problem. If Thread C 212 releases Resource 3 210, the dependencies will clear. However, if Thread C 212 is waiting for Resource 1 204, a deadlock exists and the processing associated with each of the three threads 202 208 212 will stop. This is one form of blockage caused by a wait-chain among resources and threads.

A related situation, a hang, may occur when one thread, for example, Thread C 212, may not be waiting for another resource, but instead is slow or stopped. All the preceding elements (threads 202, 208 and resources 204, 206) will be blocked until Thread C 212 releases Resource 3 210. It is not just threads that can cause hangs, but also resources. For example, if Resource 3 210 is a network connection, it may itself be too slow or unable to make progress, even though its owner, Thread C 212 is active and making progress. A third related wait-chain relationship is an orphaned resource, which occurs when one thread, for example, Thread C 212, is simply non-existent, either because it terminated or was killed. A chain that contains an orphaned resource also represents a hang, because all the threads that are waiting for the orphaned resource to be released are prevented indefinitely from making progress.

The resources of FIG. 2 may be those traditionally thought of as resources, such as, memory locations, print queues, database queues, etc. However, with respect to their ability to play in wait-chain relationships, other functions may also fall into the category of resources that are atypical. For example, a remote procedure call (RPC) may cause the caller thread to wait until the callee thread returns the result. In this case, we say that the RPC is owned by the callee thread. When the result is slow in coming or lost, the RPC may be part of a wait-chain that represents a hang, as discussed above. Other kinds of response-oriented operations, such as acquiring locks or semaphores, waiting for network or I/O connections, or sending a message and waiting for the receiver to process it, may also act in this manner.

Figure 2A:
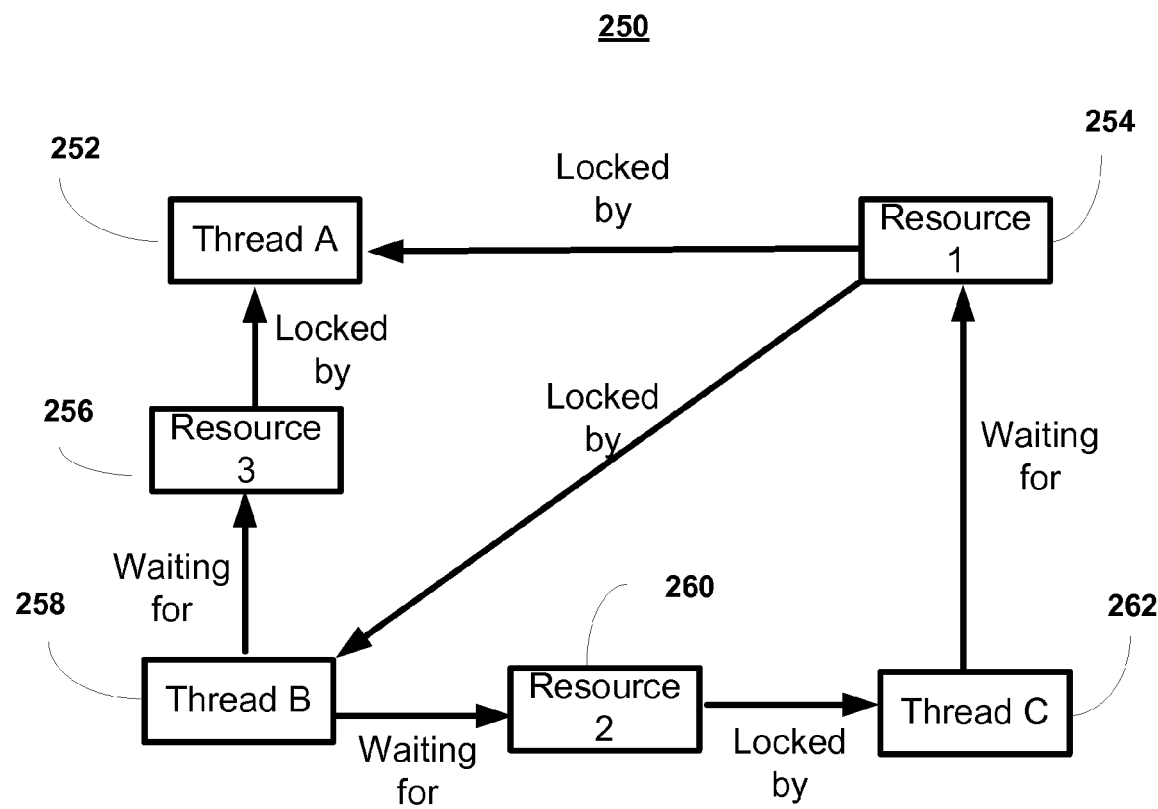
FIG. 2A is a block diagram depicting a multiple thread/resource relationship in accordance with one or more embodiments.

As well, the threads and resources involved in a wait-chain are not necessarily restricted to one-to-one relationships. As shown in FIG. 2A, a thread can wait for multiple resources and a resource can be owned by multiple threads. In FIG. 2A, a graph 250 of threads and resources shows Thread A 252 owns Resource 1 254. Thread B 258 is waiting for Resource 2 260 and Resource 3 256. Resource 3 256 is owned by Thread A 252. In the other branch of the graph, Thread B 258 is waiting for Resource 2 260 and owns Resource 1 254. Resource 2 260 is owned by Thread C 262. The deadlock cycle is completed by Thread C 262 waiting for Resource 1. Even in the presence branches or multiple dependencies, the techniques for identifying and verifying deadlocks, hangs, and orphans still apply.

Figure 3:
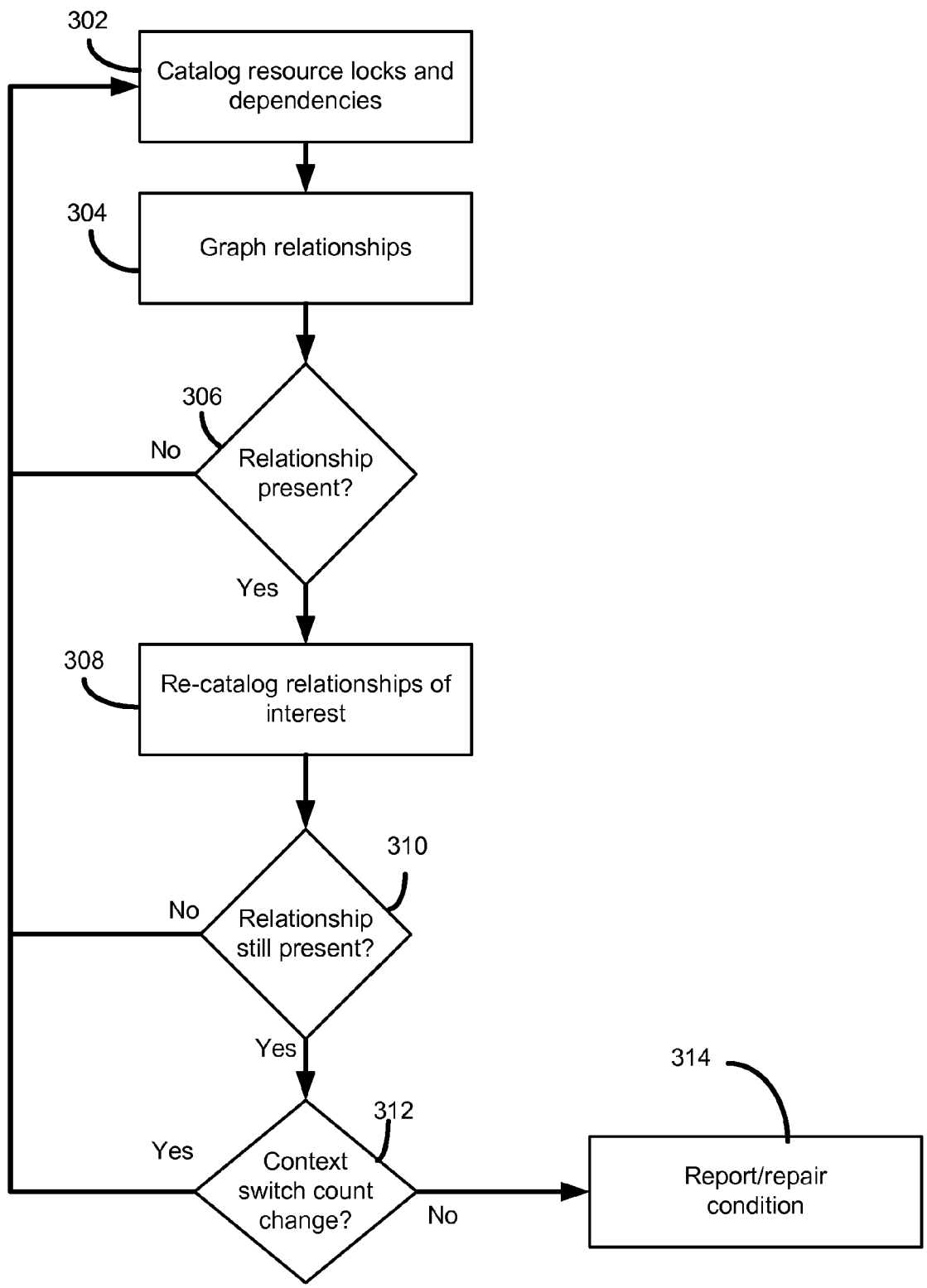
FIG. 3 is a flow chart depicting a method of determining a deadlock or hang in a computer in accordance with one or more embodiments.

FIG. 3, a method of determining a deadlock or hang in a computer, is discussed and described. At block 302, a process running on a computer 110 may catalog or enumerate threads waiting for a resource as well as resources being locked or owned by threads. A graph of these relationships may be made at block 304. The graph may be a list, data structure, or other representation of the data. The graph may include unique identification of the thread, such as a thread handle. Thread data may also include a context switch count, indicative of the state of processing of the thread. In one embodiment, the cataloging of threads waiting for a resource and resources locked or committed to threads may be done asynchronously to other processes operating with the memory where the resource dependency data is stored. That is, cataloging may occur at the same time other processing is in progress and may also occur with the same or lower priority. This is in contrast to known methods of stopping all processes while a deterministic analysis of wait-chain relationships is performed. This synchronous method of looking for wait-chains is inefficient at best and in some cases may cause fatal timing problems in the halted processes.

The relationship data may be analyzed to determine if a potential wait-chain relationship exists at block 306. For example, a potential wait-chain relationship may be a cycle, that is, a combination of threads waiting for resources and resources waiting for ownership, such as a lock, held by a thread that loops back on itself, as shown in FIG. 2, in other words, a deadlock. Another wait-chain relationship may be a hang, as exemplified by a series of events that persist over a period of time with a common terminal point, the source of the hang. A hang is different from a deadlock in that a deadlock having a cycle will never clear without outside intervention while a hang may be dependent on an extremely slow resource such as that available over a network. The hang may clear itself when the slow resource finally completes its task and returns data or sends an error.

Another wait-chain relationship that can cause processing failure is a non-existent thread, that is, a thread in a wait-chain relationship that has been killed or otherwise stopped. The surrounding threads and resources may be held by a thread that simply no longer exists. When no wait-chain relationship is identified, the no branch from block 306 may be taken to block 302 and the process started over, in some cases after a delay period. If a wait-chain relationship is found, the yes branch from block 306 may be taken to block 308.

At block 308, data corresponding to locked resources and threads may again be gathered. While a complete catalog, similar to the first, may be taken, it may be more efficient to only catalog the elements identified as being of interest at block 306. At block 310 the data may be analyzed to determine if the wait-chain relationship identified at block 306 still exists, and the threads in the wait chain have not made progress. Depending on how the data was collected an exhaustive search may be required. If only data of interest is cataloged it may be quicker to compare only the elements of interest to the prior list. In one embodiment, a way to verify that threads have not made progress is to check the context switch count that the operating system increments every time a thread runs on a processor.

In an alternative embodiment, the cataloging at block 308 may be done in the reverse order of thread appearance at block 302 starting from a thread that can be frozen (prevented from making progress) for the duration of the verification step. This can be done by requesting the OS to freeze the thread temporarily, or by having the thread in question itself run the verification step, since while it is running that step, it cannot do anything else, including releasing a locked resource. Matching in this fashion is especially valuable in verifying wait-chains in situations where a context switch count may not be available. This method works because threads on a wait-chain that is verified in the opposite order of the waiting relationship are guaranteed not to have made progress. Because each of the resources being analyzed may be more quickly identified as not having changed between measurements, this method may allow easier verification of a deadlock or hang.

If the context switch count has changed and the change is not attributable to the analysis process, then the Yes branch from block 312 may be followed to block 302. When there are no changes in context switch count except those that can be accounted for, then the No branch from block 312 may be followed to block 314.

At block 314, information about the threads involved in the wait-chain relationship may be reported to a monitor or other process capable of breaking the deadlock. To break the deadlock a number of methods may be used, including killing one of the threads. Another method may be to force an error from the resource that causes the thread to release the lock. By enabling an error to be returned, other processes involved may be able to recover both more quickly and with fewer side effects than the more dramatic technique of simply killing the offending process.

Another application of this technique may be applied to preventing deadlocks from occurring in the first place. When a thread is about to place a lock, the two-step cataloging process may be initiated to see if the proposed new wait-chain relationship will introduce a deadlock.

As mentioned above, resource locks may be placed and released hundreds at a time and last as short as microseconds. By taking advantage of the persistent nature of a deadlock or hang, the need to exhaustively catalog every resource lock, particularly in real-time, may be eliminated. Thread dependencies and resource ownerships may be cataloged and analyzed on an intermittent basis over relatively long periods of time, for example, a second or more. Deadlocks and hangs may be positively identified in the second measurement step simply by comparing the second measurement data to the approximation of resource ownerships and thread dependencies of earlier measurement. In contrast to a timeout scheme, this method may allow the identification and resolution of the deadlock before a user is aware of any problem.

An application programming interface (API) which may facilitate debugging a failed process thread by identifying the most crucial point of a wait-chain may improve the debugging process. For example, an application such as Microsoft Word® may become unresponsive while running on a Microsoft Windows®-type OS during the printing process and the user may forcibly terminate the application. The root cause of this particular failure may be that a Word® process is waiting for a print spooler process that is executing a complicated or time-consuming operation. Live debugging may obtain information about the spooler process, but this method is not usually practical given the need for live support personnel. Also, current Windows Error Reporting® (WER®) may only send post-mortem process memory dump information regarding the failed application and not its dependencies. Debugging the root cause of the problem may be impossible using only the post-mortem process memory dump information. The API, however, may determine all process thread dependencies on the client's machine at the time of the failure as a wait-chain, indicate this dependency to an automated diagnosis system or personnel, and collect the process memory dumps of both Word®, the related print spooler processes, and any or all processes included in or related to the wait-chain.

The following methodology and API may present an approach to find the thread or process responsible for a hang (a failure class when the application becomes unresponsive) on a user's machine when the original failing thread is blocked on other threads/processes through a variety of synchronization objects. Collection of other process dumps involved in the failure as well as quick identification and prioritization of classes of hangs such as those caused by deadlocks may also be possible through this approach.

As described above, a major class of application failures are hangs. A large percentage of hangs are caused when the thread that became unresponsive and caused the hang was blocked waiting on other threads or processes. In this scenario, blaming the original hung thread for the failure and using it for debugging analysis may be insufficient. Information may be collected on the specific threads and processes upon which the original failure thread is blocked so that root cause analysis may be performed on the thread or process at the end of the blocking chain.

When a hang occurs on a user's machine, a unified API may be called that provides a wrapper around all the OS instrumentation and returns a wait-chain consisting of a chain of threads and synchronization objects starting with the original hung thread. A synchronization object is an object whose handle may be specified to coordinate the execution of multiple threads. More than one process can have a handle to the same synchronization object, making inter-process synchronization possible.

Figure 4:
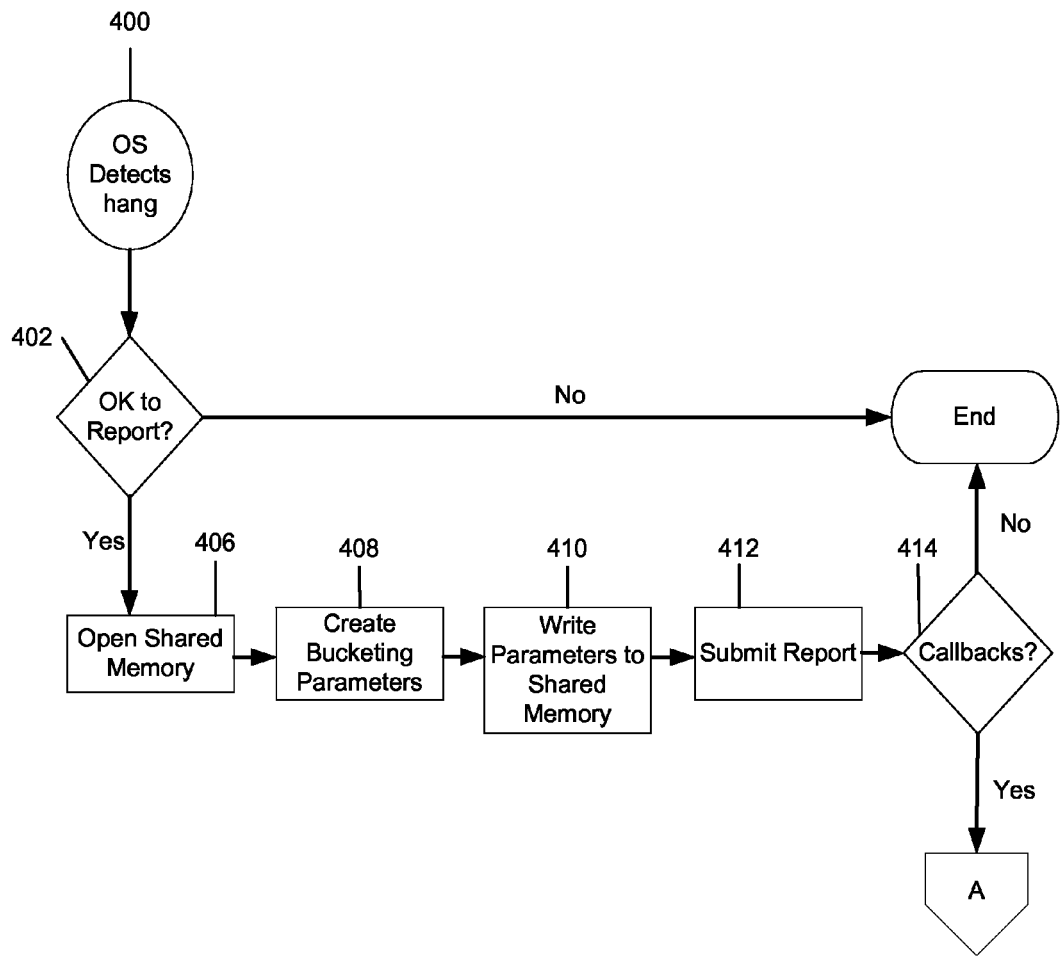
FIG. 4 is a flow chart depicting a method of reporting a thread responsible for a system failure in accordance with one or more embodiments.

Generally, and with reference to FIG. 4, a system hang may be reported by the illustrated API. Beginning at block 400, the OS may detect a hang scenario as previously described. At block 402, a user or system setting may determine whether or not the hang should be reported through WER® to a centralized debugging service such as the Microsoft Watson® remote application program 185, a present user, or any other destination. If, at block 402, the report is denied, the API ends. If, at block 402, the report is acknowledged, at block 406, the API may open a memory module shared between Watson® and the computer system 110. At block 408, the API may create a set of process bucketing parameters which describe the system hang. The process bucketing parameters may include, but are not limited to, the name of the executable file or process that generated the hang, the hung file or process version, a timestamp of the hung file or process, a hash of the hung thread's call stack, and type code parameters indicating what kind of hang occurred (i.e., in-process mutex, out-of-process mutex, deadlock, hung process has a modal dialog, hang reporting was invoked via end task, thread wait, or process wait). Information about what kind of threads and resources were involved in the hang may be obtained through a call to the method described above in relation to FIG. 3.

As previously described, this method may provide a chain of nodes starting with the original hung thread and may indicate which threads, processes, and resources including synchronization objects are involved in the blocking call. At block 410, the API may write the bucketing parameters to the shared memory opened at block 406. At block 412, the API may then submit a report containing all bucketing parameters to the Watson® remote application program 185, or other destination.

Figure 5:
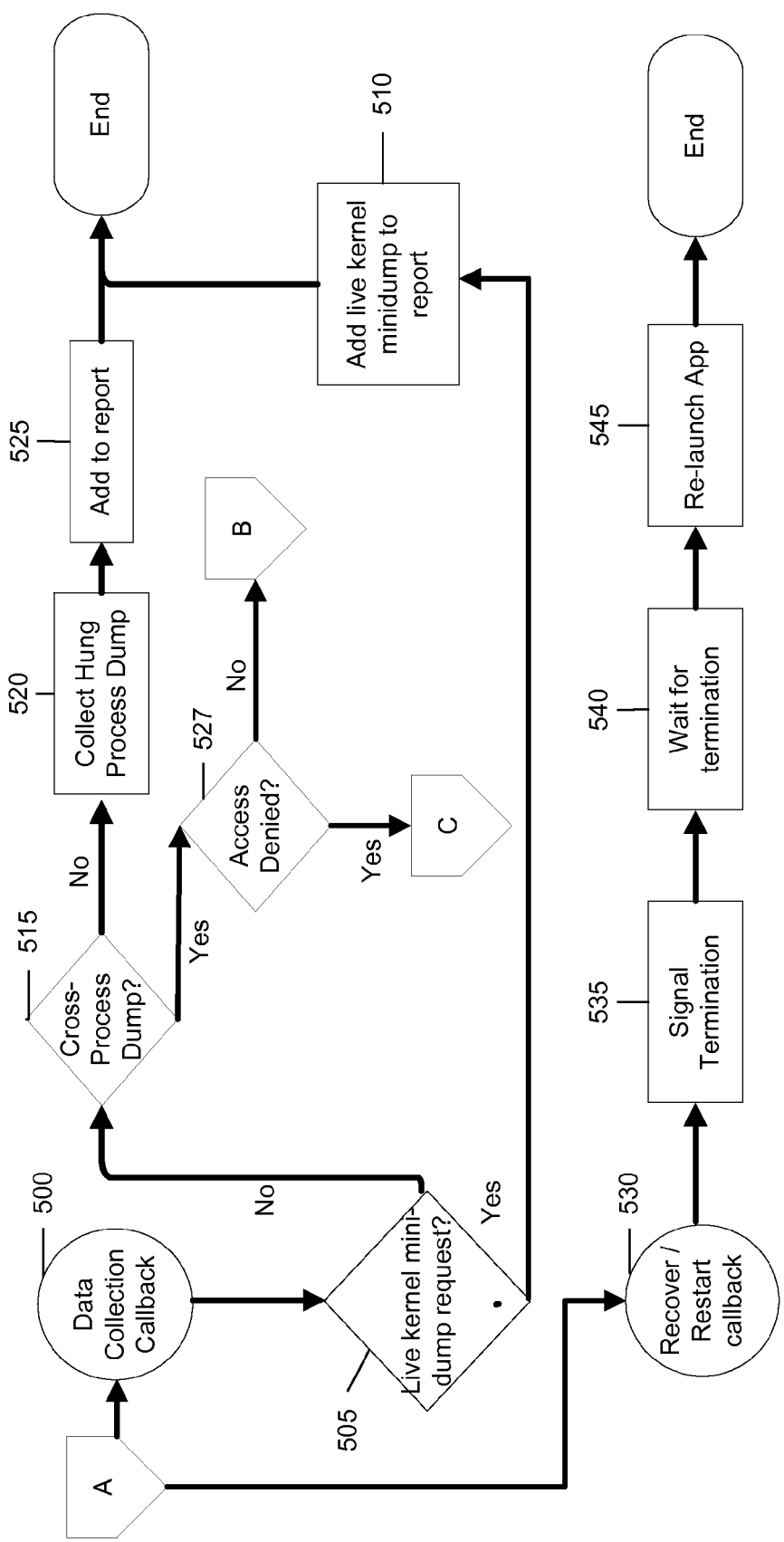
FIG. 5 is a flow chart depicting, in particular, the callback method of the method of reporting a thread responsible for a system failure in accordance with one or more embodiments.

Once a user or the Watson® remote application program 185 analyzes the bucketing parameter report submitted at block 412, at block 414, the user or application program may initiate a callback for additional information related to the hang. If, at block 414, no callbacks are initiated, the API will end. Referring to FIG. 5, callbacks from a user or the Watson® remote application program may be described. At block 500, the API may determine if the request of block 500 is for a live kernel mini-dump. A live kernel mini-dump may consist of information related to the hung process and all the threads in that process and may include a header, basic OS information, information related to the processor control block (PRCB), an OS module list, faulting thread or process stack and context data, context data pages, or any targeted or default kernel data. If the callback is for a live kernel mini-dump, at block 510, the API may add the liver kernel mini-dump information to the error report.

If the callback is not for a live kernel mini-dump, then, at block 515, the API may determine if the callback is for a cross-process dump. If, at block 515, callback is not for a cross-process dump, then the API may collect the hung process dump at block 520. At block 525, the API may add the dump to the error report to end the API. The hung process dump may include the bucketing parameters related to the hung process only.

At block 515, the callback may request a cross-process dump, and at block 527, the user or the system may grant or deny access to information related to that data. Access to the cross-process dump information may be stet by the user or may be set by default. If, at block 527, access to the information is denied, the API may, at block 625, proceed with protected process data collection. If, at block 527, access to the information is not denied, the API may proceed with cross-process data collection.

Figure 6:
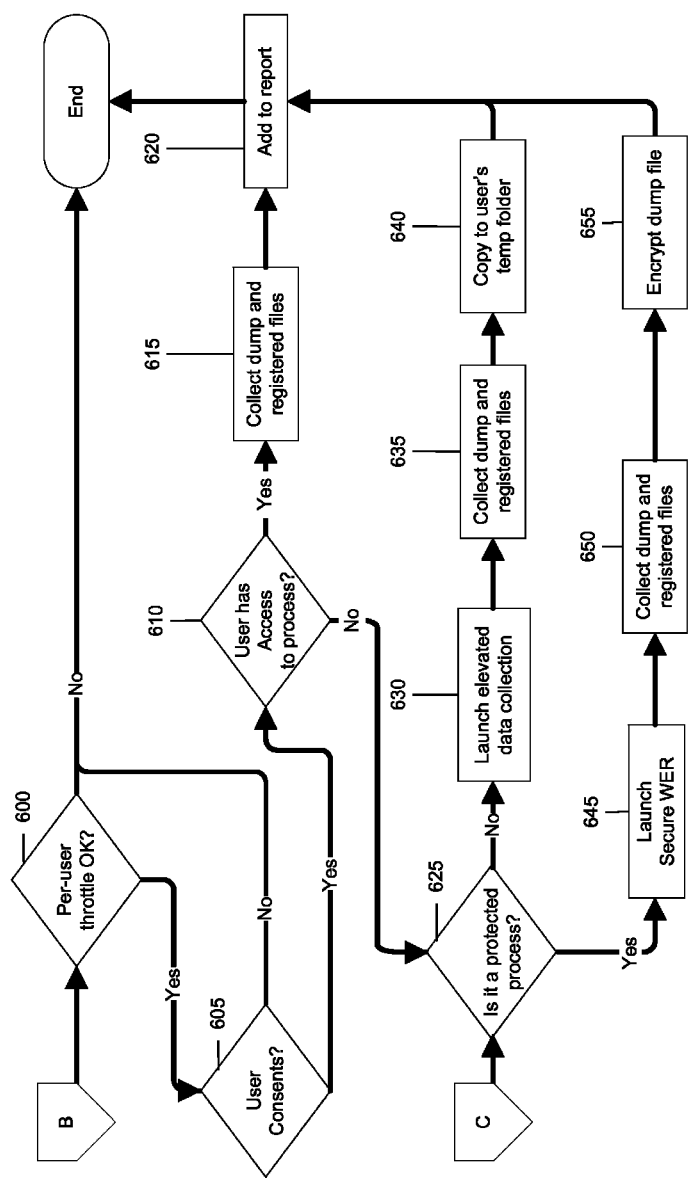
FIG. 6 is a flow chart depicting, in particular, the cross-process hang reporting method of the method of reporting a thread responsible for a system failure in accordance with one or more embodiments.

With reference to FIG. 6 at block 600, a per-user throttle may be used to prevent users of the WER® remote application program 185 from repeatedly and unnecessarily collecting cross-process dumps. If, at block 600, the callback does not meet this throttle, then the API may not send a further report. If, at block 600, the throttle is met, then at block 605 the API may ask the user if it may collect further process information regarding the hang. If the user does not consent, the API may not send a further report.

If, at block 605, the user consents to further reporting, and, at block 610, the user has access to the process, then, at block 615, the API may collect all cross-process dumps and any other files registered with the service. A cross-process dump may include the bucketing parameters related to any process associated with the hung process or included in the original wait-chain. The cross-process dump may also include the application name and version of the process on which the hung application is blocked. This information may be sent in addition to the previously-described bucketing parameters. This information may be particularly helpful when the hang is due to a process other than the one that originated the hang.

At block 620, the API may add the reports collected at block 615 to the error report and send them to WER®. At block 605, the user may consent to further reporting but, at block 610, the user may not have access to the hung process and may initiate protected process data collection. If, at block 625, the hung process is not protected, at block 630, the API may launch elevated data collection and collect a cross-process dump, a live kernel mini-dump, or any other protected information. Elevated data collection may allow the method to collect any information about the system. A process may be protected if it relates to any application or information which may be particularly sensitive to the system's 110 stability and security or the user personally. Either the user by preference or the system by default may determine whether a process should be protected. At block 635, the API may collect the cross-process dump, the live kernel mini-dump, and any other registered files, and at block 640, may copy the dumps to the user's temporary folder.

At block 620, both dumps may be added to the error report and the API may end. If, at block 625, the process is protected, at block 645, the API may launch secure WER®. Secure WER® may be sensitive to the security and stability issues of protected processes and at block 650, the API may collect the cross-process dump and any other registered files and, at block 655, the API may encrypt the collected files before, at block 620, adding the files to the report.

Referring to FIG. 5, at block 530, the remote application program 185 may also initiate a callback to recover and restart the hung process. An application may register for recovery and restart. To recover a hung application, the API may inject a new Win32 thread into the hung process and initiate restart. For restart, the API may retrieve a registered restart command line and, at block 535, may signal the OS to terminate the application. At block 540, the API may wait a period of time for the OS to signal that the application has terminated. At block 545, the API may then re-launch the hung application and end.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims Accordingly, it should be understood that the methods and apparatus described herein are illustrative only and are not limiting upon the scope of the claims.

What is claimed is:

1. A computer-implemented method comprising:
    performing, by a target thread suspected of failure, a verification process including collecting data corresponding to one or more resources and threads starting at the target thread and continuing in a reverse order of thread appearance;
    receiving an indication of a failed process associated with the target thread;
    opening a shared memory with an external entity;
    generating a report based on the indication of the failed process, the report configured to be written to the shared memory, wherein generating the report comprises:
        receiving a callback from the external entity for more information associated with the target thread,
        adding to the report, responsive to the callback, one or more of a live kernel mini-dump associated with the target thread or a cross-process dump associated with the target thread,
        encrypting the one or more of a live kernel mini-dump associated with the target thread or the cross-process dump, and
        transmitting the report to the external entity; and
    repairing the failed process based on the report, the repairing the failed process comprising forcing an error on a resource on which the target thread is locked to cause the target thread to release a lock on the resource.

2. The computer-implemented method of claim 1, wherein the failed process is associated with a particular system, and wherein the indication of the failed process is received and the report is generated while other processes are running on the system.

3. The computer-implemented method of claim 1, wherein receiving the indication of the failed process comprises:
    checking whether a context switch count associated with the target thread changes over a specific period of time; and
    receiving the indication of the failed process responsive to an indication that the context switch count has not changed over the specific period of time.

4. The computer-implemented method of claim 1, further comprising comparing one or more other running processes to the report to determine if a failure may occur in the one or more other running processes.

5. The computer-implemented method of claim 1, further comprising restarting the process that generated the system failure in response to receiving a notification from the operating system that the process is terminated.

6. The computer-implemented method of claim 1, wherein generating the report further comprises determining that the callback from the external entity meets a per-user throttle; and responsive to determining that the throttle is not met, requesting user consent to transmit the report to the external entity.

7. A computer-implemented method comprising:
    performing, by a thread suspected of being locked on a resource, a verification process including collecting data corresponding to one or more resources and threads starting from the thread and continuing in a reverse order of thread appearance;
    receiving an indication of a system failure;
    opening a memory location that is shared with an external entity;
    creating a report that includes an identifier for a process that generated the system failure and a type identifier for the system failure, the report configured to be written to the shared memory location;
    submitting the report to the external entity;
    receiving a callback from the external entity for more information about the system failure;

adding to the report one or more of the live kernel mini-dump associated with the system failure or the cross-process dump associated with the system failure;

encrypting the one or more of a live kernel mini-dump associated with the system failure or the cross-process dump associated with the system failure;

reporting, responsive to the callback, one or more of the live kernel mini-dump associated with the system failure or the cross-process dump associated with the system failure to the external entity; and repairing the system failure by forcing an error on a resource on which the process is locked to cause the process to release a lock on the resource.

8. The computer-implemented method of claim 7, wherein the system failure comprises one or more of a process hang condition or a system deadlock condition.

9. The computer-implemented method of claim 7, wherein the system failure comprises a deadlock condition of the thread.

10. The computer-implemented method of claim 7, wherein receiving the indication of the system failure comprises:

checking whether a context switch count associated with the process that generated the system failure changes over a specific period of time; and receiving the indication of the failed process responsive to an indication that the context switch count has not changed over the specific period of time.

11. The computer-implemented method of claim 7, wherein the report further includes version information for the process, a timestamp associated with the process, and a hash of a call stack associated with the process.

12. The computer-implemented method of claim 7, further comprising:

comparing one or more system conditions to the report to determine if the system conditions may generate a failure similar to the system failure; and responsive to determining that the system conditions may generate a failure similar to the system failure, taking one or actions with respect to the system conditions to prevent the failure similar to the system failure.

13. The computer-implemented method of claim 7, further comprising:

requesting that an operating system terminate the process that generated the system failure;

restarting the process that generated the system failure in response to receiving a notification from the operating system that the process is terminated.

14. The computer-implemented method of claim 7, further comprising collecting initial data to determine an order of thread appearance.

15. One or more computer readable storage media storing computer-executable instructions, the instructions being configured to be executed by a computing device to:

receive an indication of a failed process associated with a target thread responsive to verification by a verification process run by the target thread suspected of failing to detect a deadlock condition, the verification process configured to:

collect data corresponding to one or more resources and threads beginning at the target thread and continuing in the reverse order of thread appearance, analyze the data to determine if the one or more resources and threads have changed between measurements, and responsive to determining that the one or more resources and threads have not changed, provide verification that the deadlock condition exists;

responsive to receiving the indication of the failed process, open a memory location that is shared by the computing device and an external entity;

make a report available to the external entity based on the indication of the failed process, the report based on the indication of the failed process made available to the external entity by writing the report to the memory location that is shared by the computing device and the external entity;

receive a callback from the external entity for more information about the failed process;

add to the report, responsive to the callback, one or more of a live kernel mini-dump associated with the target thread or a cross-process dump associated with the failed process, encrypt the one or more of a live kernel mini-dump associated with the target thread or the cross-process dump;

transmit, responsive to the callback, the one or more of a live kernel mini-dump associated with the failed process or the cross-process dump associated with the failed process to the external entity; and repair the failed process by forcing an error on a resource on which the target thread is locked to cause the target thread to release a lock on the resource.

16. The one or more computer readable storage media of claim 15, wherein the instructions are further configured to be executed by the computing device to receive the indication of the failed process and transmit the report to the external entity while other processes are running on the computing device.

17. The one or more computer readable storage media of claim 15, wherein the failed process results from the deadlock condition of the target thread.

18. The one or more computer readable storage media of claim 15, wherein the instructions are further configured to be executed by the computing device to:

compare a thread condition of the computing device to the report to determine if the thread condition may generate a failure similar to the failed process; and responsive to determining that the system conditions may generate a failure similar to the failed process, take one or actions with respect to the thread condition to prevent the failure similar to the failed process.

19. The one or more computer readable storage media of claim 15, wherein the instructions are further configured to be executed by the computing device to restart the process that generated the system failure in response to receiving a notification from the operating system that the process is terminated.

20. The one or more computer readable storage media of claim 15, wherein the instructions are further configured to be executed by the computing device to request user consent to transmit the report to the external entity.

* * * * *